US008670628B2

(12) United States Patent
Robinson et al.

(10) Patent No.: US 8,670,628 B2
(45) Date of Patent: Mar. 11, 2014

(54) MULTIPLY ADAPTIVE SPATIAL SPECTRAL EXPLOITATION

(75) Inventors: Ian S. Robinson, Redondo Beach, CA (US); Eric P. Frans, Culver City, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 153 days.

(21) Appl. No.: 13/210,449

(22) Filed: Aug. 16, 2011

(65) Prior Publication Data

US 2013/0044963 A1 Feb. 21, 2013

(51) Int. Cl.
*G06K 9/40* (2006.01)

(52) U.S. Cl.
USPC .......................................................... 382/250

(58) Field of Classification Search
None
See application file for complete search history.

(56) References Cited

U.S. PATENT DOCUMENTS

| | | | | | |
|---|---|---|---|---|---|
| 5,384,853 | A | * | 1/1995 | Kinoshita et al. | 381/71.12 |
| 6,088,103 | A | * | 7/2000 | Everett et al. | 356/503 |
| 6,804,400 | B1 | | 10/2004 | Sharp | |
| 8,203,114 | B2 | | 6/2012 | Robinson et al. | |
| 2008/0275349 | A1 | * | 11/2008 | Halperin et al. | 600/484 |
| 2010/0288910 | A1 | * | 11/2010 | Robinson et al. | 250/208.1 |

FOREIGN PATENT DOCUMENTS

EP 1 724 724 A1 11/2006

OTHER PUBLICATIONS

Signal Processing for Hyperspectal Image Exploitation. Gary Shaw and Dimitris Manolakis. 2002 IEEE. pp. 12-16.*
Detection Algorithms for Hyperspectral Imaging Applications. Dimitris Manolakis and Gary Shaw. 2002 IEEE pp. 29-43.*
Adaptive Anomaly Detection Using Subspace Separation for Hyperspectral Imagery. Heesong Kwon, Sandor Z. Der, and Nasser M. Nasabadi. Nov. 2003. pp. 3342-3350.*
Liu et al.; "A Nested Spatial Window-Based Approach to Target Detection for Hyperspectral Imagery"; IEEE Standards No. 0-7803-8742-2; pp. 266-268 (2004).
Kwon et al.; "Adaptive anomaly detection using subspace separation for hyperspectral imagery"; Optical Engineering; 42(11):3342-3351 (2003).
Manolakis et al.; "Hyperspectral Image Processing for Automatic Target Detection Applications"; Lincoln Laboratory Journal; 14(1):79-116 (2003).

(Continued)

*Primary Examiner* — Stephen R Koziol
*Assistant Examiner* — Delomia Gilliard
(74) *Attorney, Agent, or Firm* — Pierce Atwood LLP; Joseph M. Maraia

(57) ABSTRACT

A method of filtering hyperspectral image data associated with a hyperspectral image to produce a detection image data having a plurality of pixels, where the detection image data is associated with the degree to which a target may be present in a pixel. The method also includes adaptively processing the detection image data to determine a background variation in the plurality of pixels. The method additionally includes establishing a plurality of spatial filters for the detection image data, where each of the plurality of spatial filters are associated with energy being received at different locations on each of the plurality of pixels, and where the outputs of the plurality of spatial filters are weighted by the variation in background. The method further includes applying each of the plurality of spatial filers to the detection image data, such that each of the plurality of pixels are associated with a selected one of the plurality of spatial filters.

14 Claims, 5 Drawing Sheets

(56) References Cited

OTHER PUBLICATIONS

Schweizer et al.; "Efficient Detection in Hyperspectral Imagery"; IEEE Transactions on Image Processing; 10(4):584-597 (2001).

Schweizer et al.; "Hyperspectral Imagery: Clutter Adaptation in Anomaly Detection"; IEEE Transactions on Information Theory; 46(5):1855-1871 (2000).

Extended European Search Report; Munich, Germany; European Application No. 12171552.8, Filing Date: Jun. 11, 2012; Dated: Nov. 21, 2012.

Robinson et al.; "Comparison of Hyperspectral Sub-Pixel Detection With and Without A Priori Knowledge of Target Features"; Aerospace Conference—IEEE; Mar. 21-28, 1998; New York, NY, USA; vol. 5, pp. 183-189.

Samson et al.; "Point Target Detection and Subpixel Position Estimation in Optical Imagery"; Applied Optics—Optical Society of America; Washington DC, USA; Document ID: XP-002486603; vol. 43, No. 2, pp. 257-263 (Jan. 10, 2004).

Soni et al.; "Performance Evaluation of 2-D Adaptive Prediction Filters for Detection of Small Objects in Image Data"; Transactions on Image Processing—IEEE; New York, USA; vol. 2, No. 3, pp. 327-340 (Jul. 1, 1993).

\* cited by examiner

FIG. 3

MULTIPLY ADAPTIVE SPATIAL SPECTRAL EXPLOITATION

BACKGROUND

Hyperspectral imaging collects and processes information from across the electromagnetic spectrum. For example, hyperspectral imagers may be configured to collect and distinguish electromagnetic energy from a plurality of wavelength bands, such as those corresponding to ultraviolet, visible, and infrared light. Typically, hyperspectral imaging sensors collect hyperspectral image data as a set of images of a scene. In some embodiments, each image includes information in two spatial dimensions (i.e. "X" and "Y" dimensions) of the scene for a different wavelength range, or spectral band, of the electromagnetic spectrum. As shown in FIG. 1, multiple images, showing the spatial dimensions across a plurality of wavelength ranges, can be combined to form a three dimensional datacube for processing and analysis, where the spectral information forms the third dimension (i.e. a "Z" dimension). In some embodiments, the spectral information from each image is recorded as a spectral vector associated with each X/Y spatial coordinate from the spatial dimensions. Thus, a hyperspectral data cube may span in two spatial dimensions and one spectral dimension.

Hyperspectral imaging captures many spatial images, each associated with a relatively narrow spectral band, over a contiguous spectral range. As such, this may produce a spectrum associated with each pixel in the scene. For example, a sensor configured to receive twenty spectral bands might be considered hyperspectral when it covers a narrow range from 500 to 700 nm with twenty 10-nm-wide bands that span the entire 500-700 nm range. Conversely, a sensor that images twenty discrete bands within a wide spectral range (i.e. where wavelength gaps separate the twenty discrete bands through the spectral range) would be considered a multispectral sensor.

The precision of hyperspectral imaging sensors may be measured in spectral resolution (i.e. the width of each band of the spectrum that is captured). In some embodiments, sensitivity to a larger number of relatively narrower spectral bands may facilitate identification of objects of interest even if those objects are only captured in a handful of pixels. However, spatial resolution is a factor in addition to spectral resolution. If the pixels are spatially too large, then multiple objects can be captured in the same pixel and become difficult to identify. If the pixels are spatially too small, then signals from one object can spread over multiple pixels, which reduce the intensity of the signals from the object on each pixel, reduce the signal-to-noise ratio, and deteriorate the reliability of object identification. Any number of optical systems may be associated with a hyperspectral imager so as to increase the optical system's ability to identify the objects of interest.

As discussed in U.S. patent application Ser. No. 12/466, 191, incorporated herein by reference in its entirety, it may be advantageous to facilitate detection of small targets using hyperspectral imaging systems utilizing optics with a reduced aperture size. For example, where hyperspectral imagers are mounted on air-based or space-based platforms, the aperture size of the optics on such platforms may greatly increase the overall cost of such systems. Thus, analytical algorithms or other processing techniques may be utilized with a hyperspectral imaging sensor so as to compensate for a reduction in optics, which may reduce the weight and/or cost of the hyperspectral imaging system.

Many conventional hyperspectral imaging sensors are designed to utilize a small f-number (a large f-cone) and attempt to limit the blur size to the width of a spatial pixel to maximize the signal-to-noise ratio for each pixel. Such design characteristics typically utilize a large telescope aperture or a large physical pixel on the hyperspectral sensor. While large apertures increase the weight, as discussed above, large physical pixels in the hyperspectral sensor result in large ground sample distances (GSDs) when projected on the ground. The GSD is the correspondence of each pixel to the area resolved. For example, a satellite based sensor may have a 1 meter GSD, meaning that each resolved pixel corresponds to 1 square meter of ground. As such, a large GSD resulting from large physical pixels negatively affects the ability of hyperspectral imaging systems to detect target objects, as multiple targets may be blended into a single pixel.

Some conventional hyperspectral imaging systems are able to detect targets whose dimension is comparable to or smaller than a spatial pixel. For example, some hyperspectral imaging sensors may be configured so that the optical blur, also known as the point spread function (PSF), is smaller than a pixel on the sensor. Where such sensors are utilized for high quality single-color imaging, the blur typically spans several pixels. Such systems may rely on spatial contrast of edges and texture for target detection, such as by comparing the spectral contrast of a target to its surroundings. However, spectral contrast degrades when optical blur is much larger than a pixel, and little energy from a target is captured on any given pixel.

Accordingly, it may be appreciated that where the blur of an optical system is greater than the size of a pixel (either by design or unintentionally), image processing may be utilized to enhance analysis of the hyperspectral image data, facilitating target detection on detectors where low energy is found on any given pixel.

One such image processing technique, entitled Adaptive Spatial-Spectral Processing ("ASSP"), is described in U.S. patent application Ser. No. 12/466,191, incorporated herein in its entirety by reference. ASSP operates on the output of a spectral filter (i.e. a spectral matched filter) which has converted a hyperspectral data cube to a scalar image, where a value at each pixel represents a detection score. By utilizing an adaptive set of weighting to aggregate target energy distributed around each pixel, a ratio of signal-to-clutter (SCR) may be improved. With ASSP, a weighted average of several pixels in the detected image is taken, and the weights are adapted for the ambient clutter levels. However, the signals across multiple pixels that are aggregated in ASSP by using weighted sums are the product of a fixed set of weights developed assuming a target is centered in a pixel, and an adaptive set of weights that change with scene clutter. As such, no consideration is made in ASSP to account for, among other things, non-centered positions of target signals across a plurality of pixels. Although the improvement of the SCR from ASSP is significant (i.e. from approximately a 20% SCR to approximately a 50% SCR), further improvement is desirable.

SUMMARY

According to an embodiment, a method of filtering data associated with a hyperspectral image includes receiving detection image data having a plurality of pixels, the detection image data associated with the hyperspectral image. The method also includes processing the detection image data to determine a background in the plurality of pixels. The method additionally includes establishing a plurality of spatial filters for the detection image data. Each of the plurality of spatial filters are associated with energy being received at different locations on each of the plurality of pixels, and the plurality of spatial filters are weighted by the background. The method further includes applying each of the plurality of spatial filers to the detection image data, such that each of the plurality of pixels are associated with a selected one of the plurality of spatial filters.

According to another embodiment, an article of manufacture comprises a physical nontransitory computer readable medium containing computer executable instructions for filtering data associated with a hyperspectral image. When executed on a processor, the instructions carry out the function of receiving detection image data having a plurality of pixels, the detection image data associated with the hyperspectral image. The instructions also carry out the function of processing the detection image data to determine a background in the plurality of pixels. The instructions additionally carry out the function of establishing a plurality of spatial filters for the detection image data. Each of the plurality of spatial filters are associated with energy being received at different locations on each of the plurality of pixels, and the plurality of spatial filters are weighted by the background. The instructions further carry out the function of applying each of the plurality of spatial filers to the detection image data, such that each of the plurality of pixels are associated with a selected one of the plurality of spatial filters.

According to yet another embodiment, a system for filtering data associated with a hyperspectral image includes one or more processors. The one or more processors are configured to receive detection image data having a plurality of pixels, the detection image data being associated with the hyperspectral image. The one or more processors are also configured to process the detection image data on the one or more processors to determine a background in the plurality of pixels. The one or more processors are additionally configured to establish a plurality of spatial filters for the detection image data. Each of the plurality of spatial filters are associated with energy being received at different locations on each of the plurality of pixels, and the plurality of spatial filters are weighted by the background. The one or more processors are further configured to apply each of the plurality of spatial filers to the detection image data, such that each of the plurality of pixels are associated with a selected one of the plurality of spatial filters.

These and other objects, features, and advantages will be apparent from the present disclosure. It is to be understood that the summary, detailed description, and drawings are not restrictive of the scope of the inventive concept described herein.

BRIEF DESCRIPTION OF THE DRAWINGS

FIG. 3 depicts phasing of four exemplary embodiments of target energy distributed on an array of pixels;

DETAILED DESCRIPTION

Figure 1:
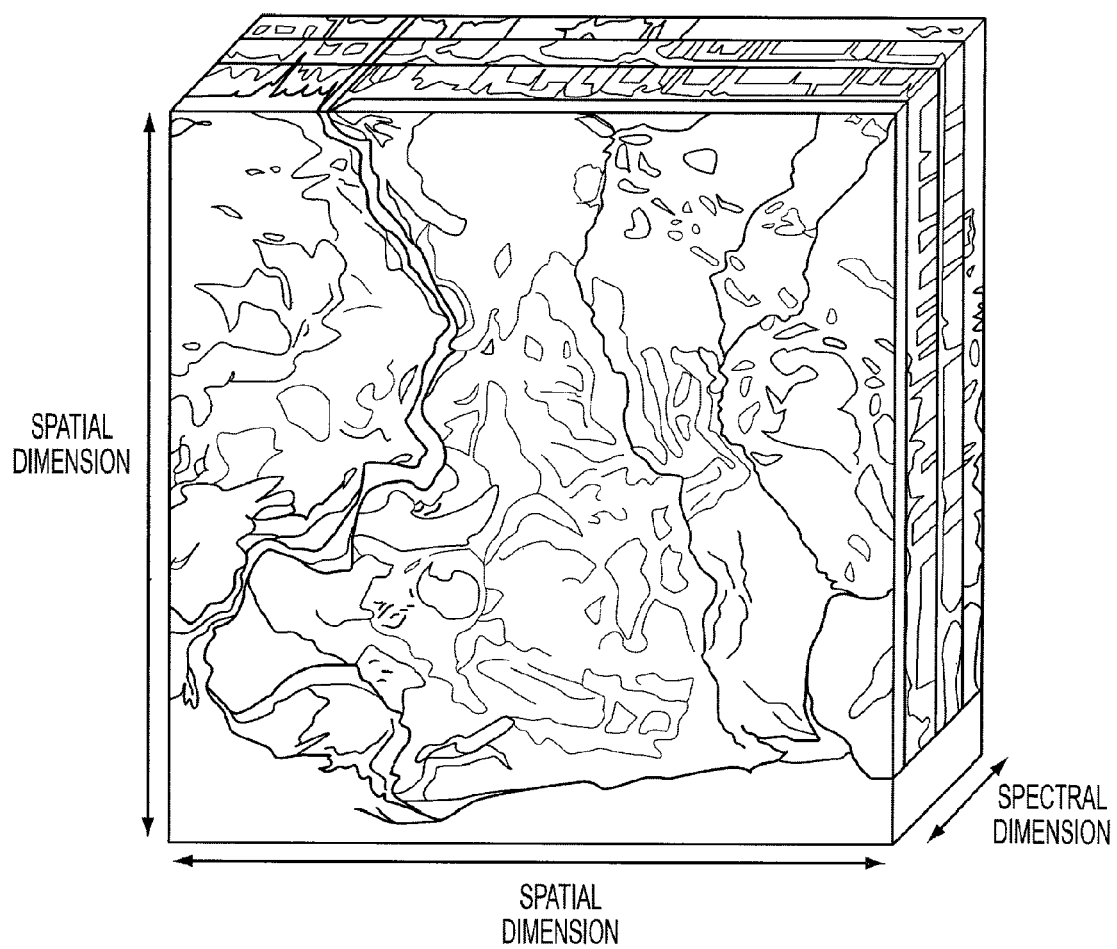
FIG. 1 depicts a schematic example of a hyperspectral datacube.
Figure 2:
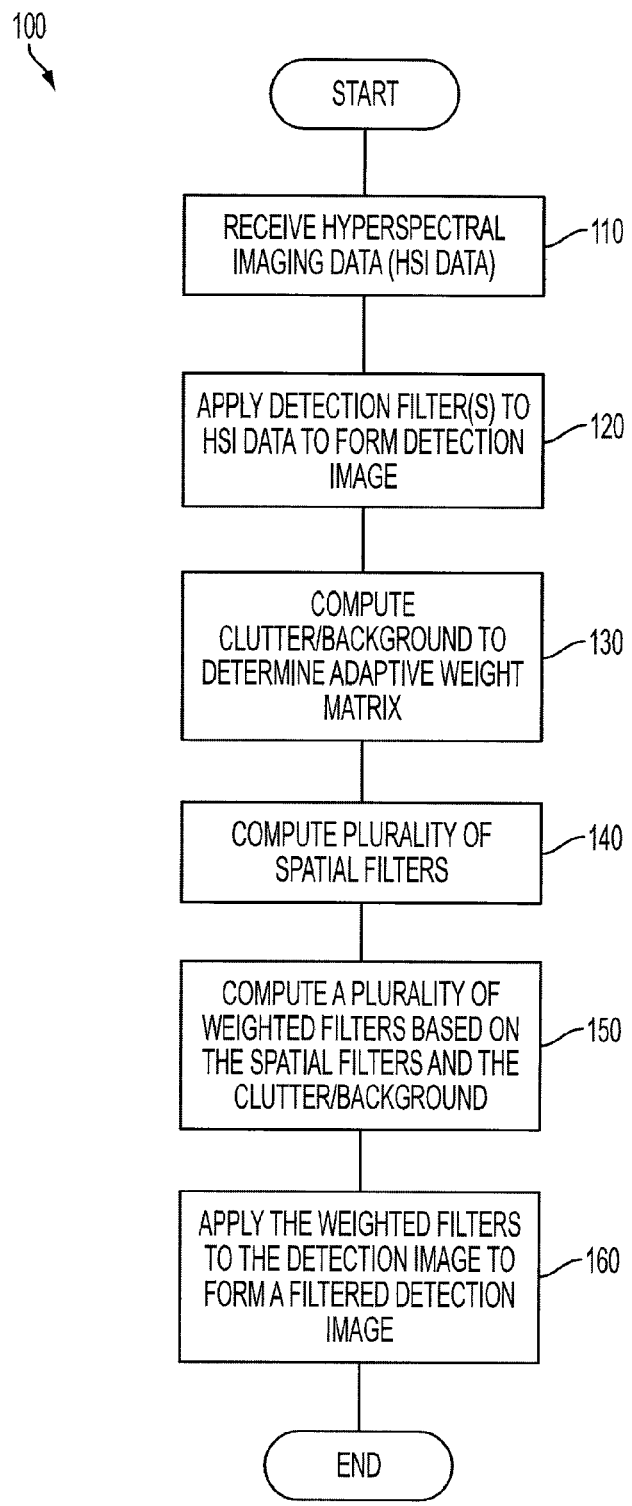
FIG. 2 depicts a method of filtering hyperspectral imaging data.

Depicted in FIG. 2 is an embodiment of method 100 for processing hyperspectral imaging data to facilitate target detection therein. As described below, method 100 may facilitate target detection where hyperspectral imaging data ("HSI data") is recorded by a hyperspectral imaging sensor such that the target energy is spread across multiple pixels by adaptively combining data from the multiple pixels. Accordingly, a hyperspectral imager having a smaller aperture but a similar focal length may provide equivalent or improved target detection capabilities. Accordingly, targets that are the size of or smaller than the GSD may be detected with low false alarm levels, improving the GSD performance of existing hyperspectral imagers, or facilitating equivalent GSD performance on lighter and cheaper hyperspectral imagers.

As depicted in FIG. 2, method 100 may begin at 110, whereby HSI data is received or otherwise input for analysis. The HSI data may be of any appropriate form, including but not limited to a three-dimensional datacube, such as one having two spatial dimensions and a third spectral dimension. In various embodiments, the data in the spectral dimension may include a spectral vector, spectral data for a plurality of spectral bands imaged by the hyperspectral imager, or so on. The data may be received from any appropriate hyperspectral imager, and method 100 is not anticipated to be limited by the type of hyperspectral data source.

Once the HSI data is received at 110, method 100 may continue at 120 by applying one or more detection filters to the HSI data, such that a detection image is formed. In an embodiment, the detection image is a 2D representation of a particular data set associated with the imaged scene. In an embodiment, the detection image is a two-dimensional (x,y) image or other dataset with scalar values at each (x,y) location. In an embodiment, the scalar values represent the output of some detection process or filter. Accordingly, in various embodiments, a variety of detection filters may be applied at 120, either alone or in combination with one another. In one non-limiting embodiment, a detection filter applied at 120 may include a spectral match filter, whereby a weighted dot product of the dataset spectral vector with a target reference spectral vector is calculated at each pixel (replacing a spectral vector at that location with the scalar dot product). In some embodiments, the scalar dot product may show a correlation between the pixel in the detection image and a reference spectrum (i.e. that from the material of a vehicle, a particular type of mineral, or so on). In an embodiment, the detection filter can comprise subtracting a global background from each pixels of the hyperspectral imaging data, which in various embodiments can be computed from the all pixels of the hyperspectral imaging data, using any suitable methods. For example, the global background can be the mean of the spectra of all pixels of the hyperspectral imaging data, or be selected from a database of known backgrounds. Other filters may include, for example, calculating the angle between the dataset spectral vector and the target reference spectral vector.

After the detection image is generated at 120, method 100 may proceed at 130 by computing its clutter (i.e. background). In some embodiments, the clutter may include everything in the scene besides the targets. For example, such clutter may include generic elements of the scene (i.e. the ground, oceans, urban buildings, or so on). The clutter may also include noise or artifacts that are added into the data unintentionally, such as those due to atmospheric effects, or artifacts from the imaging detector. In an embodiment, the computed clutter for the detection image may be represented as an adaptive weight matrix B, which may be a matrix with a number of elements associated with correlations at different spatial offsets from the imaged scene. The effect of the adaptive weight matrix B, is to create a weighted filter W to inhibit the accumulation of background clutter when the clutter of closely spaced pixels is correlated, thus optimizing the accumulation of target signal relative to background clutter in the weighted filter W. In particular, in some embodiments the adaptive weight matrix B may represent the amount of correlation in the entire image, as discussed below. Additionally, in some embodiments, the clutter correlation may be computed in local area subsets (i.e. from dividing the detection image into blocks of pixels of a predetermined size), where each local area subset would generate a local adaptive weight matrix B. Accordingly, in some such embodiments, the adaptive weight matrix B may comprise an n-by-n matrix, where each element of the matrix is a number based on the spatial correlations of the output of the detection filter. As such, the computed adaptive weight matrix B may be considered "adaptive" due to its dependence upon statistics that result from the detection filter applied at 120. In some embodiments, characterizing the clutter may comprise calculating a spatial covariance matrix, while in other embodiments, characterizing the clutter may comprise calculating the spatial correlation matrix. Both the spatial covariance and correlation matrices are also described in greater detail below. As described in greater detail below, the adaptive weight matrix B may be computed as the inverse of either the spatial covariance or spatial correlation matrix.

Method 100 may then proceed at 140 by computing a plurality of spatial filters, each filter configured for a different target phasing (i.e. where the target energy has been deposited relative to the center of the pixels). In an embodiment, a number of spatial filters may be user selected. In another embodiment, the number of spatial filters may be a fixed number greater than or equal to two. A variety of configurations of the spatial filters, for an associated variety of target phasings, are described in greater detail below.

Each of the plurality of spatial filters computed at 140 may then be weighted at 150, so as to produce a plurality of weighted spatial filters. In an embodiment, weighting the spatial filters may comprise multiplying each of the spatial filters by the background/clutter adaptive weight matrix B computed at 130. Accordingly, the weighted spatial filters are derived from the detection image. Calculations of the weighted spatial filters may be performed by any suitable mechanism, and in various embodiments may be calculated in series, iteratively, in parallel, or so on. In an embodiment, each of the spatial filters and the background may be provided as a matrix, such that the weighted spatial filter is also a matrix. In this embodiment, application of the filter is the multiplication of each element of the spatial filter matrix with the corresponding element of the data image, followed by summing over all the elements of the spatial filter matrix. In another embodiment, the weighted spatial filter matrix and data image matrix may be reshaped as vectors. In this embodiment, the element by element multiplication and sum can be written as the dot product of two vectors (the spatial filter and the data image) or as the product of a transposed spatial filter vector with the data image vector, as if they are 1×n matrices. It may be appreciated that the equations described below are written using the transpose because each element of the spatial filter, also referred to as the spatial reference vector, consists of the optical blur function integrated over the corresponding spatial location (for the assumed target position). The transpose indicates that each element of the spatial reference vector is multiplied by the corresponding spatial element of the spectral filter output, and then the result is summed over the elements. This process calculates the correlation of the hypothesized target blur to the spectral filter output. As such, in some embodiments the weighted spatial filter may by computed as $W_m^T = S_m^T B$, where "W" is a weighted filter, "S" is a spatial filter, "B" is the background or clutter adaptive weight matrix (which is the inverse of the correlation or covariance matrix), "T" denotes that the vectors are transposed, and "m" indicates a particular one of the plurality of spatial filters.

Once each of the weighted spatial filters are computed at 150, method 100 may proceed at 160 with applying the weighted filters to the detection image, as described in greater detail below. In particular, applying the weighted spatial filters at 160 may create a filtered detection image. The filtered detection image may subsequently be utilized for target detection, whereby targets may be more clearly resolved over background/clutter in the image. In some cases, the values at each pixel of the filtered detection image may be compared against a threshold to determine the presence of one or more targets therein (i.e. where a value above a threshold may indicate the presence of a target, while a value below a threshold may indicate the lack of a target).

Performing threshold detection or other target detection on the filtered detection image may be appreciated as a discrete calculation, outside the scope of the present disclosure. Thus, a user of method 100 may subsequently apply any number of threshold calculations or other target detection techniques to the filtered detection image to perform target detection or other analysis with the imaged data. As an example, one such threshold calculation technique may is compute the standard deviation of the values at each pixel of the filtered detection image, and set the threshold at a certain number of standard deviations, whereby a pixel that is more than a number of standard deviations above the mean may be considered a target. As another example, in some techniques a certain number of the highest values may be declared potential targets, even if some or all of those potential targets are false. Accordingly, while those "false targets" may be selected for additional review, further imaging, or so on, it is more likely that any real targets will be among the potential targets, and will also be revisited.

As indicated above, in some embodiments computing the clutter at 130 may comprise calculating a spatial covariance or correlation matrix for the scene. If the detection image is whitened, however (i.e. the mean=0, and the covariance equals a unit matrix), then the spatial covariance and correlation are equal. If the detection image has not been whitened, then in various embodiments either or both of the spatial covariance and the correlation may be calculated. In some embodiments, a user may select which to calculate. In other embodiments, both may be calculated, and a user may select which to utilize when computing the plurality of weighted filters at 150. When calculating the spatial covariance or correlation matrix, averaging the overlaying of the original detection image with the shifted detection image may result in small offsets showing a correlation that is stronger than at large offsets. Specifically, the correlation between a detection image pixel and a nearby pixel is greater than the correlation between the detection image pixel and a more distant scene pixel. Accordingly, in areas that are generally background or noise, there will typically be a decrease in correlation between the pixels as they are shifted further across one another.

In some embodiments, calculating the spatial covariance or correlation to compute the clutter/background at 130 may comprise multiplying the detection image with a copy of itself that has been shifted by a small amount (i.e. one pixel) and averaging over all image pixels. It may be appreciated that in some embodiments the data from offset portions of the detection image may be loaded for use during the calculation, as described below. By averaging the values over a particular region (i.e. a local area), similarity of the image over the spatial scale of the shifted amount may be ascertained. In various embodiments, any number of pixels of shifting may be utilized (such by one, two, or three pixels, in various embodiments) and in any number of directions (i.e. horizontally, vertically, diagonally, or so on). It may be appreciated that such shifting may generally have a greater resultant average for small shifts, rather than large shifts, which may facilitate ascertaining the spatial scale of changes in the background/clutter in the detection image. Accordingly, calculating the spatial covariance may facilitate determining the weighting filter W which can optimize the ratio of accumulated target response to accumulated background/clutter response. The weighted filter W will accumulate pixel signal in a local region. The adaptive weight matrix B modifies the weights to preferentially accumulate target rather than background clutter.

In an embodiment, the spatial covariance between two pixels that are offset by i pixels in the x dimension and j pixels in the y dimension may be calculated as:

$$C(i, j) = \frac{1}{N} \sum_{k,l} (\text{data}(k, l) - \text{mean})(\text{data}(k - i, l - j) - \text{mean})$$

where N is the total number of pixels being summed k*l, and the mean is the average of the data, or:

$$\text{mean} = \frac{1}{N} \sum_{k,l} (\text{data}(k, l)).$$

Additionally, data(k,l) is the detection image at the first pixel, and data(k−i, l−j) is the detection image at the offset pixel. For spatial covariance C(i,j), the mean over all pixels is subtracted from each pixel, prior to multiplying and summing. In contrast, in embodiments wherein computing the clutter at 130 comprises calculating a spatial correlation matrix Cor(i,j), the mean is neglected in the calculation, and only the multiplication of the offset pixels is performed prior to the summation. For example, Cor(i,j) may be calculated as:

$$Cor(i, j) = \frac{1}{N} \sum_{k,l} (\text{data}(k, l)(\text{data}(k - i, l - j))$$

It should be noted that in various embodiments the adaptive weight matrix B may be calculated from either of C(i,j) or Cor(i,j) by inverting C(i,j) or Cor(i,j), such that the matrix $B = C(i,j)^{-1}$ or $B = Cor(i,j)^{-1}$.

Figure 3:
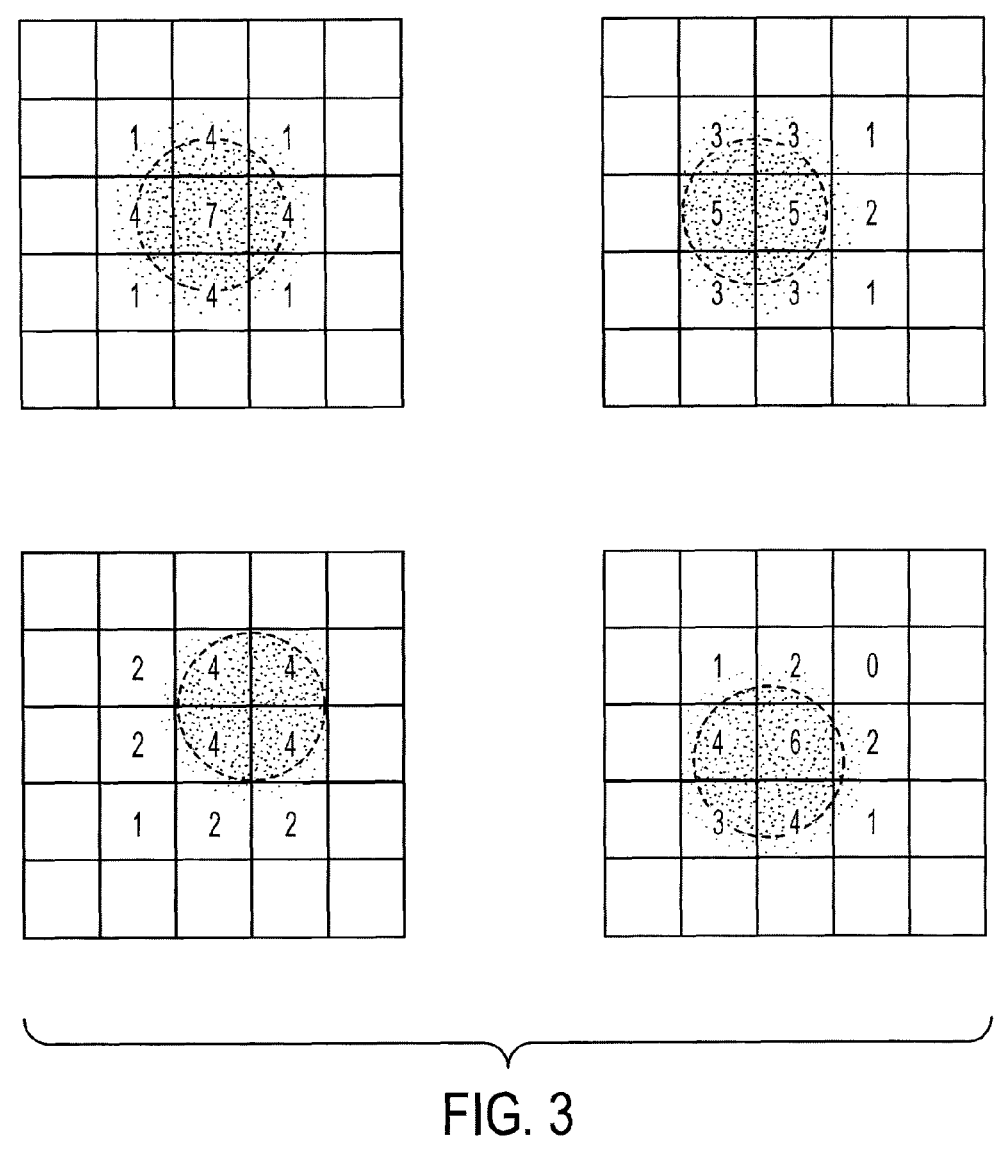

As previously noted, the plurality of spatial filters calculated at 140 may be for differing target phasings, which again represent where the target energy has been deposited relative to the center of the pixels. When energy from a scene is distributed across pixels, the point spread function may be blurred such that the energy is smeared into neighboring pixels. Depending on the size of the pixel, how focused the energy is, and other considerations, any given pixel may receive a large quantity of energy, or a plurality of pixels may receive a small amount of energy each. Depicted in FIG. 3 are four nonlimiting examples of how energy may be distributed across pixels. In the upper-left panel, the energy is centered on a pixel (represented by one of the squares). In the upper-right panel, the energy is centered between two neighboring pixels. In the lower-left panel, the energy is centered at corners of four neighboring pixels. In the lower-right panel, the energy of a point object is arbitrarily centered in a lower-left corner of the center pixel depicted. The numbers shown in FIG. 3 in each pixel are exemplary measures of the energy interpreted as received by each pixel, based on the different target phasings.

In some embodiments, computing the plurality of spatial filters, as described above, may comprise calculating "M" spatial filters, such that "m" is a number between one and "M," where each spatial filter $S_m$ assumes a different target phasing. In one such embodiment, there may be four spatial filters (i.e. M=4), where one filter assumes the target is centered in a pixel, one filter assumes that the target is centered on a vertical edge of a pixel, one filter assumes the target is centered on a horizontal edge of a pixel, and one filter assumes that the target is centered at a corner of a pixel. Additional spatial filters are also possible, and any number of positionings of the target relative to the pixel may be assumed by the spatial filters in those embodiments.

In an embodiment, calculating each of the spatial filters may comprise integrating the optical blur resulting from the hyperspectral imaging optics over each pixel, as well as the surrounding pixels. For each spatial filter, the integration of the optical blur may be centered on different areas (i.e. the hypothetical position of the targets). In an embodiment, the size of a box formed around each pixel that is used in the integration may be user-defined, while in other embodiments it may be calculated from the detection image. In an embodiment, the size of the box may be large enough to include the tail of the point spread function, but exclude the noise of the hyperspectral sensor. Accordingly, the size of the box may be determined as bounded by the area where the contribution of the tail of the optical blur drops below the contribution of the noise of the sensor.

In an embodiment, calculating each of the spatial filters may comprise subdividing each pixel into the locations where the center of the Gaussian from each optical blur may be positioned. In an embodiment, a pixel subdivision parameter P may be utilized, wherein the number of filters associated with the position of the Gaussian center may conform to 2P+1 points in the X and Y dimension. Such dimensions would result in $(2P+1)^2$ filters, one associated with each point. For example, where P=0, there would be a single point on the pixel (i.e. at its center). Likewise, where P=1, there would be nine points on the pixel (i.e. one at the center, one at each of the four corners, and one at each of the four sides), providing half-pixel resolution in each direction X and Y. Accordingly, where P=2, for quarter pixel resolution, there would be twenty-five points on the pixel (i.e. with nine points associated with each quarter of the pixel, with common points at the junctions of the quarters). It may be appreciated that if a single pixel is being evaluated, each of the $(2P+1)^2$ filters should be calculated to ascertain all center positions. Accordingly, for both X and Y, the p possible center positions are p/(2P), where p increments by one from zero to 2P. If adjacent pixels are being calculated, however, then the side filters may be redundant, as they will be common to those of the adjacent pixels. Accordingly, if the points for the adjacent pixels are redundant, then the total number of filters may be $(2P+1)^2 - 2(2P+1) + 1$, or $(2P)^2$. Accordingly, for both the X and Y dimensions, the p possible center positions of the filters are p/(2P), where p increments one to 2P.

To calculate each spatial filter, several inputs may be utilized. In some embodiments, the inputs may be user-defined, while in other embodiments, the inputs may be received from the detection image being analyzed. In an embodiment, one of the inputs may be a Gaussian width σ, which is the spread of the spatial function used to weight contributions from nearby pixels. In an embodiment, one of the inputs may be a filter size, which is the number of pixels to use when summing contributions from nearby pixels. In an embodiment, one of the inputs may be the pixel subdivision parameter N, as described above. Accordingly, the Gaussian integral over each pixel of the filter may conform to $$S_m(i,j) = \int_{x_j}^{x_{j+1}} \int_{x_i}^{x_{i+1}} I_0 \exp\left(-\frac{(x-x_{cm})^2}{2\sigma^2}\right) \exp\left(-\frac{(x-x_{cm})^2}{2\sigma^2}\right) dx\, dy$$

where $x_{cm}=p_x/2P$ and $y_{cm}=p_y/2P$ for $p_x=1:2P$ and $p_y=1:2P$ relative to the corner of the central pixel, and the center pixel (x,y) defines coordinates from 0 to 1, while other pixels are from −1 to 0 (i.e. the for pixel to the left), 1 to 2 (i.e. for the pixel to the right), or so on. Accordingly, each spatial filter $S_m$ may be computed by performing the calculation above for each point.

Figure 4:
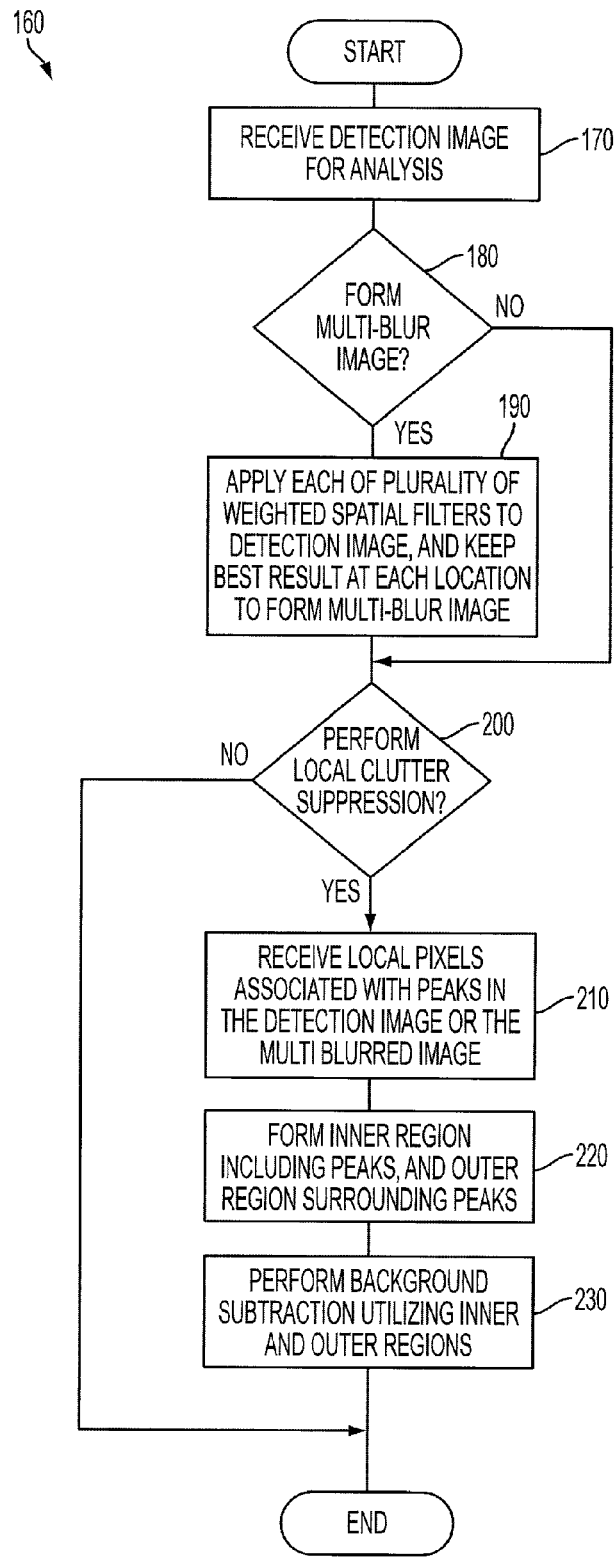
FIG. 4 shows an embodiment of a method of applying a weighted filter to a detection image that is a part of the method depicted in FIG. 2.

As indicated above, each of the plurality of weighted filters $W_m^T$ may be formed by multiplying each transposed spatial filter (i.e. $S_m^T$) by the background adaptive weight matrix B. When applying the weighted filters to the detection image at 160, such as to create a filtered detection image, a number of application techniques may be utilized, either alone or in combination with each other, to create an output that may be used for target detection. As shown in FIG. 4, applying the weighted filters at 160 may comprise at 170 receiving the detection image for analysis. In various embodiments, such as where method 100 is being operated on one or more processors, receiving the detection image at 170 may include loading the detection image into a memory unit associated with the one or more processors. In some embodiments, the detection image may be a copy of the output of applying the detection filter at 120, while in other embodiments the detection image may be stored as a single file, which is loaded both to compute the clutter/background at 130, as well as to apply the weighted filters thereto at 160 (i.e. when receiving the detection image at 170).

Once the detection image is received for analysis at 170, applying the weighted filters at 160 may proceed at 180 by determining whether to form a multi-blur image, as described below. If so, then applying the weighted filters at 160 may proceed at 190 by applying each of the plurality of weighted spatial filters, and keeping the "best" result at each location. In some embodiments, each location may be on a per-pixel basis, while in other embodiments, each location may be on a group-of-pixel basis. In various embodiments, applying each of the plurality of weighted spatial filters (i.e. applying each weighted filter $W_m$, where m is from one to M, as described above) may be performed in serial or in parallel. In an embodiment, the output $out_m(i,j)$ for each pixel (i,j) may be calculated by applying each weighted filter $W_m$ such that:

$$out_m(i,j) = \sum_{k,l} W_m(k,l) \text{data}(i+k, j+l)$$

where k and l give the extent of the filter size. For example, where the filter is a 5×5 pixel box, k and l would range from −2 to 2. In an embodiment, the "best" weighted filter $W_m$ for each location is the one that has the largest ratio of signal to clutter (i.e. signal to variance) at the location. In an embodiment, the maximal output for each pixel is selected. For example, in an embodiment, the output out(i,j) of the multi-blur image may correspond to the largest $out_m(i,j)$ for each pixel location (i,j). It may be appreciated that in some embodiments, there may be an overestimate Of the total energy deposited on the imaging sensor if the results of multiple pixels are accumulated.

In some embodiments, each weighted filter $W_m$ may be applied to an associated local area of the detection image, assembling the multi-blur image incrementally. In other embodiments, each weighted filter $W_m$ may be applied to the entirety of the detection image to form a plurality of intermediately filtered images, which may subsequently be merged such that the best result at each area is maintained in the final multi-blur image. It may be appreciated that by keeping the best result of each weighted filter $W_m$ at each location when applying the plurality of weighted spatial filters at 190, the resulting multi-blur image might or might not be accurate as to the presence of the target therein. Accordingly, in some embodiments the "multi-blur" nature of the output of applying the plurality of weighted spatial filters at 190 could be understood as resulting from the distributions of energies on the pixels potentially being contradictory with respect to one another, and blurred with respect to one another.

As shown in FIG. 4, if it is determined at 180 to not form a multi-blur image, or alternatively, once a multi-blur image is formed at 190, then applying the weighted filters at 160 may continue at 200 by determining whether or not to perform local clutter suppression. In an embodiment, such local clutter suppression may be configured to aggregate energy over several pixels using generally constant weights for a target, and different weights to estimate clutter, while performing peak detection therein. In various embodiments, local clutter suppression may alternatively be performed on the multi-blur image formed at 190, if multi-blur was performed, or on the detection image received at 170. Accordingly, in some embodiments, applying the weighted filters 160 may comprise performing multiple filtering step (i.e. both multi-blur and local clutter suppression), which in combination may offer benefits, such as reducing false positive rates, for a variety of target types. If local clutter suppression is to be performed, then applying the weighted filters at 160 may proceed at 210, by receiving the local pixels associated with peaks in the detection image or the multi blurred image. In some embodiments, identifying peaks may comprise the associated pixels having a greater value than their surrounding pixels. In some embodiments, identifying peaks may comprise the associated pixels having a threshold value greater than the mean value in the image. In other embodiments, peaks may comprise the associated pixels having a statistically significant value greater than their surroundings, or over the other pixels in the scene. In some embodiments, such as where the target energy has distributed generally evenly across a plurality of pixels, the peak detection at 210 may determine that none of the associated pixels are a peak, or may group pixels together (i.e. if the group is greater than the surrounding background by a threshold or statistically significant amount), losing resolution but permitting the grouped pixels to itself be treated as a peak.

Figure 5:
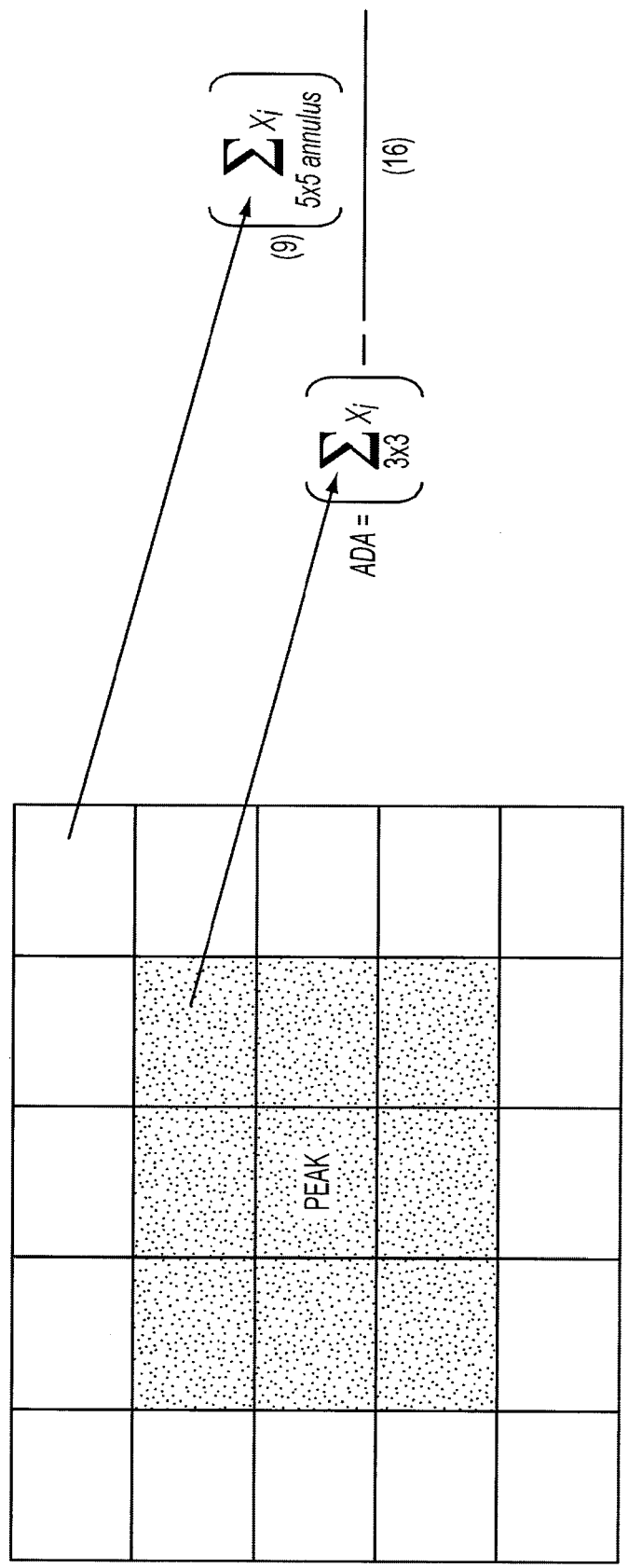
FIG. 5 shows an embodiment of a local clutter suppression technique, based on reduction of background surrounding a peak on an array of pixels.

Once the peak is determined at 210, applying the weighted filters at 160 may proceed at 220 by establishing an inner region that includes the peak (or potential target) and an outer region that surrounds the inner region. The outer region may be of any shape (i.e. a rectangle, a square, roughly circular or elliptical, or other looped assembly of pixels). In various embodiments, the size and/or shape of the inner region and the outer region may be user-selected. Once the inner and outer regions are established, then applying the weighted filters at 160 may proceed at 230 by performing a background subtraction on the peak, by summing the values of the pixels in the inner region, and subtracting the sum of the pixels in the outer region, weight adjusted for the relative numbers of pixels in the two summations. For example, as depicted in FIG. 5, a 3×3 inner region including the peak is surrounded by a 5×5 annulus (the sixteen pixels surrounding the inner region). The local clutter suppression is determined by calculating an annulus delta ("ADA" in FIG. 5), where 9/16 is an estimate of the total background in the inner region. The average background in each pixel would be 1/16 of the total of the outer region. The accumulated background in the inner sum would be estimated as 9/16 of the total of the outer region.

In an embodiment, if the peak (i.e. the sum of pixels in the inner region) is roughly approximate to the background-adjusted pixels in the surrounding outer region, then it may be understood that the alleged peak is likely a fortuitous combination of background pixels. Alternatively, if the peak is substantially greater than the surrounding background, then it may be understood that the peak is a result of the target energy therein. In various embodiments, the value of the annulus delta indicative of target energy in the peak may be a user-defined threshold, may be based on the statistical significance of the value over the surrounding background, may be based on the mean values of the image, or so on. It may be appreciated that typically local clutter suppression is applied to multi-blurred images. Although local clutter suppression could be applied to the detection filter output directly, this output may generally contain more variation, and hence more small peaks. It may be appreciated that application of the spatial filters may generally smooth the detection filter output so that there are fewer spurious peaks due to sensor noise. Typically, local clutter suppression would not directly use the weighted filters, but would instead utilize the output of the filters, which will be smoother than the input with fewer local peaks.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof. Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation.

The subject matter described herein sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of filtering data associated with a hyperspectral image, comprising:
   receiving detection image data having a plurality of pixels, the detection image data associated with the hyperspectral image;
   processing the detection image data to determine a background in the plurality of pixels;
   establishing a plurality of spatial filters for the detection image data, each of the plurality of spatial filters associated with energy being received at different locations on each of the plurality of pixels and assumes a different target phasing in which the energy is centered at different portions of the plurality of pixels, the plurality of spatial filters being weighted by the background; and
   applying each of the plurality of spatial filers to the detection image data, such that each of the plurality of pixels are associated with a selected one of the plurality of spatial filters.

2. The method of claim 1, further comprising applying a detection filter configured to assign a value to each pixel of the hyperspectral image to generate the detection image.

3. The method of claim 1, wherein processing the detection image to determine the background comprises overlaying the detection image data with an offset copy of the detection image data.

4. The method of claim 3, wherein processing the detection image to determine the background further comprises calculating a spatial covariance matrix for the detection image.

5. The method of claim 3, wherein processing the detection image to determine the background further comprises calculating a spatial correlation matrix for the detection image.

6. The method of claim 1, wherein the selected one of plurality of spatial filters associated with each of the plurality of pixels is one of the plurality of spatial filters having a largest ratio of signal to clutter associated with one or more of the plurality of pixels in a location around each of the plurality of pixels.

7. The method of claim 1, further comprising determining signal peaks associated with the detection image.

8. The method of claim 7, wherein determining signal peaks comprises comparing one or more of the plurality of pixels with one or more surrounding pixels to determine if the one or more of the plurality of pixels has a greater value than the one or more surrounding pixels.

9. The method of claim 7, further comprising forming an inner region associated with one or more of the plurality of pixels including the signal peaks, and an outer region associated with one or more of the plurality of pixels surrounding the one or more of the plurality of pixels including the signal peaks.

10. The method of claim 9, further comprising: adjusting a sum of values of the pixels in the outer region and a sum of pixels in the inner region for a relative numbers of pixels in the outer region and the inner region; and subtracting the sum of pixels in the outer region from the sum of pixels in the inner region after said adjusting.

11. An article of manufacture comprising a physical non-transitory computer readable medium containing computer executable instructions for filtering data associated with a hyperspectral image which, when executed on a processor, carry out the functions of: receiving detection image data having a plurality of pixels, the detection image data associated with the hyperspectral image; processing the detection image data to determine a background in the plurality of pixels; establishing a plurality of spatial filters for the detection image data, each of the plurality of spatial filters associated with energy being received at different locations on each of the plurality of pixels and assumes a different target phasing in which the energy is centered at different portions of the plurality of pixels, the plurality of spatial filters being weighted by the background; and applying each of the plurality of spatial filers to the detection image data, such that each of the plurality of pixels are associated with a selected one of the plurality of spatial filters.

12. The article of manufacture of claim 11, wherein the function of processing the detection image to determine the background comprises overlaying the detection image data with an offset copy of the detection image data.

13. The article of manufacture of claim 11, wherein the selected one of plurality of spatial filters associated with each of the plurality of pixels is one of the plurality of spatial filters having a largest ratio of signal to clutter associated with one or more of the plurality of pixels in a location around each of the plurality of pixels.

14. A system for filtering data associated with a hyperspectral image comprising: one or more processors configured to: receive detection image data having a plurality of pixels, the detection image data associated with the hyperspectral image; process the detection image data on the one or more processors to determine a background in the plurality of pixels; establish, using the one or more processors, a plurality of spatial filters for the detection image data, each of the plurality of spatial filters associated with energy being received at different locations on each of the plurality of pixels and assumes a different target phasing in which the energy is centered at different portions of the plurality of pixels, the plurality of spatial filters being weighted by the background; and apply each of the plurality of spatial filers to the detection image data, with the one or more processors, such that each of the plurality of pixels are associated with a selected one of the plurality of spatial filters.

* * * * *